US012560733B2

(12) United States Patent
Stewart

(10) Patent No.: US 12,560,733 B2
(45) Date of Patent: Feb. 24, 2026

(54) IDENTIFYING GEOLOGICAL STRUCTURAL STYLE IN SEISMIC REFLECTIONS

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 544 days.

(21) Appl. No.: 18/119,581

(22) Filed: Mar. 9, 2023

(65) Prior Publication Data

US 2024/0302553 A1    Sep. 12, 2024

(51) Int. Cl.
G01V 1/30        (2006.01)

(52) U.S. Cl.
CPC .................................... G01V 1/301 (2013.01)

(58) Field of Classification Search
CPC ........................... G01V 1/301; G01V 2210/64
See application file for complete search history.

(56) References Cited

U.S. PATENT DOCUMENTS

| | | | |
|---|---|---|---|
| 6,711,293 B1 | 3/2004 | Lowe | |
| 6,757,614 B2 | 6/2004 | Pepper et al. | |
| 8,725,477 B2 | 5/2014 | Zhang et al. | |
| 9,005,983 B2 | 4/2015 | McGuinness et al. | |
| 10,990,882 B2 | 4/2021 | Borrel et al. | |
| 11,852,771 B1 * | 12/2023 | Tian ......................... | G01V 1/48 |

| | | | |
|---|---|---|---|
| 2010/0027377 A1 * | 2/2010 | Zuercher .................. | G01V 1/28 |
| | | | 367/73 |
| 2014/0118350 A1 | 5/2014 | Imhof et al. | |
| 2024/0302553 A1 * | 9/2024 | Stewart .................. | G01V 1/301 |

FOREIGN PATENT DOCUMENTS

WO      WO 1999/064896        12/1999

OTHER PUBLICATIONS

Analysis of geological structures, 1st ed., Cambridge University Press, Aug. 1990, pp. 127 and 128.
Anderson "The dynamics of faulting," Transactions of the Edinburgh Geological Society, Mar. 1905, 8(3):387-402, 16 pages.

(Continued)

*Primary Examiner* — Daniel Pihulic
(74) *Attorney, Agent, or Firm* — Fish & Richardson P.C.

(57)        ABSTRACT

Methods and systems for determining a geological structural style of a subterranean formation include acquiring seismic reflection measurements of the subterranean formation; isolating one or more signals in the acquired measurements, the one or more signals having larger amplitudes relative to one or more other signals in the acquired measurements; obtaining a set of structural geology geometric primitives wherein each structural geology geometric primitive comprises geometric data representing a known structural geological style; identifying at least one best fit between a set of the one or more isolated signals and a structural geology geometric primitive from the set of structural geology geometric primitives; determining a degree of confidence for at least one best fit identified; and determining a geological structural style of the subterranean formation based on the identified at least one best fit and based on the determined degree of confidence for that best fit.

20 Claims, 5 Drawing Sheets

(56) References Cited

OTHER PUBLICATIONS

Balanced Geological Cross-sections: An essential technique in geological research and exploration, vol. 6, Crawford and Padovani (eds)., Jan. 1989, 139 pages.

Boyer et al. "Thrust Systems," AAPG Bulletin, Sep. 1982, 66(9): 1196-1230, 36 pages.

Catuneanu, "Model-independent sequence stratigraphy," Earth-Science Reviews, Jan. 2019, 188:312-388, 77 pages.

Confalonieri et al., "A historical perspective of explainable Artificial Intelligence," WIREs Data Mining and Knowledge Discovery, Oct. 2020, 11(1), 21 pages.

Fernandez et al. "Quantifying and correcting errors derived from apparent dip in the construction of dip-domain cross-sections," Journal of Structural Geology, Jan. 2003, 25(11):35-42, 8 pages.

Groshong "3-D Structural Geology: A practical guide to quantitative surface and subsurface map interpretation," Geology, Second Edition, Springer-Verlag, Berlin, Jan. 2006, pp. 49-53, 5 pages.

Gunderson et al., "Machine learning applications to seismic structural interpretation: Philosophy, progress, pitfalls, and potential," 2021, AAPG Bulletin, 106:11, 2187-2202, 16 pages.

Healy et al., "Stress, faulting, fracturing and seismicity: the legacy of Ernest Masson Anderson," Geological Society, 367(1):6 pages.

Hubbert "Graphic Solution of Strike and Dip from Two Angular Components," AAPG Bulletin, Jan. 1931, 283-286, 4 pages.

Judge et al., "Assessing uncertainties in balanced cross sections," Journal of Structural Geology, Apr. 2011, 33(4):458-467, 10 pages.

Mcclay et al., "4-D Evolution of Rift Systems: Insights from Scaled Physical Models," AAPG Bulletin, Jun. 2002, 86(6):935-959, 25 pages.

Mitchum et al., "Seismic stratigraphy and global changes of sea level, part 2: the depositional sequence as a basic unit for stratigraphic analysis," AAPG Memoir, 1977, 26:53-62, 10 pages.

Mitchum, et al., "Seismic stratigraphy and global changes of sea level, part 6: stratigraphic interpretation of seismic reflection patterns in depositional sequences," AAPG Memoir, 1977, 26:117-133, 17 pages.

Roberto et at., "Modeling and reasoning techniques in geologic interpretation," IEEE Transactions on Systems, Man, and Cybernetics—Part A: Systems and Humans, Sep. 1999, 29(5):460-473, 14 pages.

Stewart et al., "Salt tectonics in the North Sea Basin: a structural style template for seismic interpreters," Deformation of the Continental Crust: The Legacy of Mike Coward. Geological Society, London, Special Publications, Feb. 2007, 272:361-396, 36 pages.

Stewart, "Vertical exaggeration of reflection seismic data in geoscience publications 2006-2010," Marine and Petroleum Geology, May 2011, 28(5):959-965, 7 pages.

Van Hoek et al., "Geometric attributes for seismic stratigraphic interpretation," The Leading Edge, Sep. 2010, 1056-1065, 8 pages.

Vilone et al., "Notions of explainability and evaluation approaches for explainable artificial intelligence," Information Fusion, May 2021, 76, 89-106, 18 pages.

Williams, Tectonics and seismic sequence stratigraphy: an introduction, Tectonics and Seismic Sequence Stratigraphy, 1993, 71:13 pages.

Xia et al., "Geometric Primitives in LiDAR Point Clouds: A Review," IEEE Journal of Selected Topics in Applied Earth Observations and Remote Sensing, 2020 13, 687-707, 24 pages.

Xu et al., "Seismic facies analysis: Past, present and future," Earth-Science Reviews, 224:103876, 30 pages.

* cited by examiner

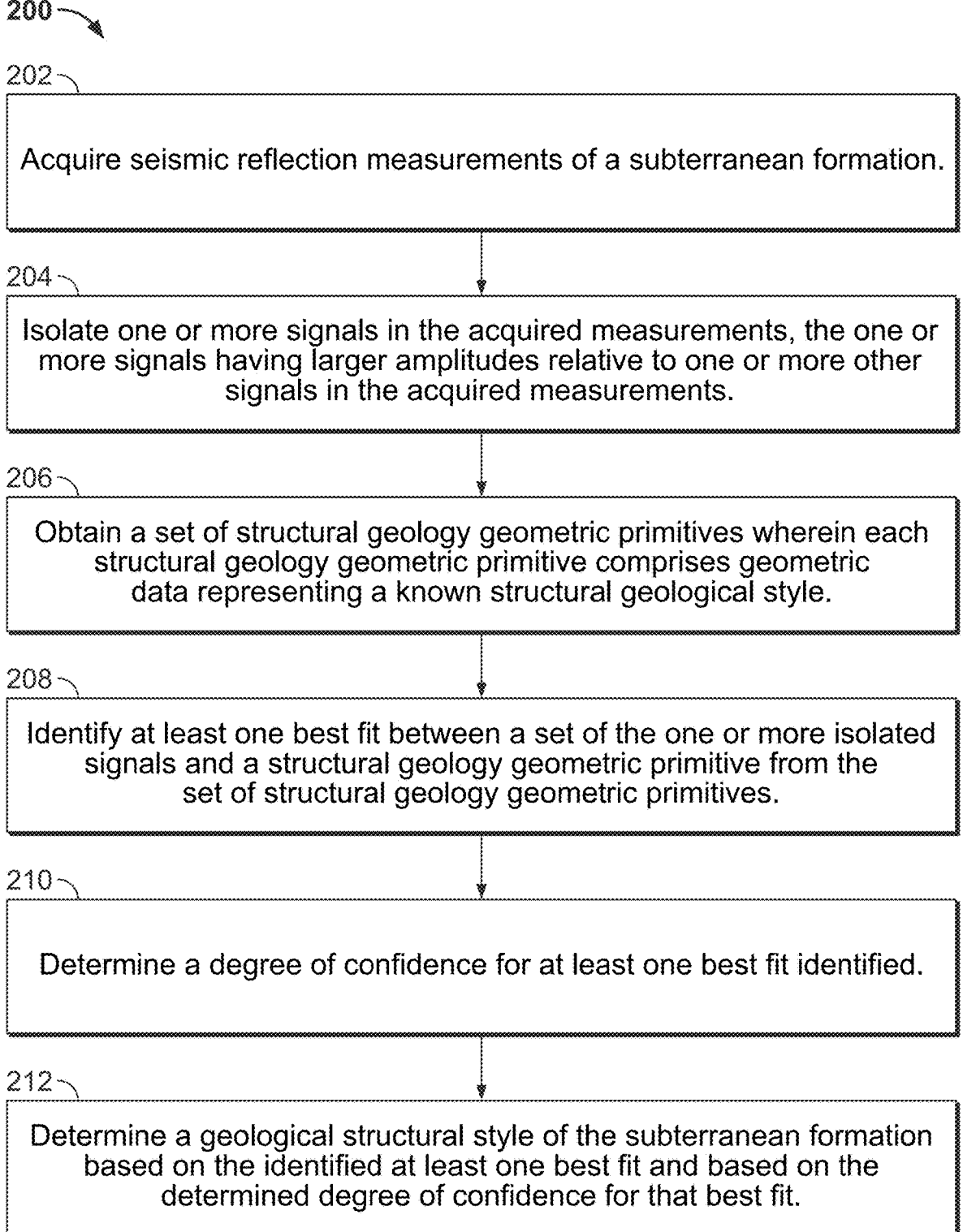

200

202

Acquire seismic reflection measurements of a subterranean formation.

204

Isolate one or more signals in the acquired measurements, the one or more signals having larger amplitudes relative to one or more other signals in the acquired measurements.

206

Obtain a set of structural geology geometric primitives wherein each structural geology geometric primitive comprises geometric data representing a known structural geological style.

208

Identify at least one best fit between a set of the one or more isolated signals and a structural geology geometric primitive from the set of structural geology geometric primitives.

210

Determine a degree of confidence for at least one best fit identified.

212

Determine a geological structural style of the subterranean formation based on the identified at least one best fit and based on the determined degree of confidence for that best fit.

Compression    Strike slip    Extension 303    303    305    303
305    305
302    305    304    306    305

310

400

402

↓ 204

405

404

405

Compression     Strike slip     Extension

406

↓ 208

408

405

409

405
409
420

410    414    412    416    418    422    422    424    424

IDENTIFYING GEOLOGICAL STRUCTURAL STYLE IN SEISMIC REFLECTIONS

TECHNICAL FIELD

The present disclosure generally relates to geophysical exploration of a subterranean formation using reflection seismology.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and other applications of subsurface characterization and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications such as, for example, identification of potential petroleum reservoirs. Seismic surveys are conducted by using a controlled seismic source (for example, Vibroseis or dynamite) to create a seismic wave. The seismic source is typically located at ground surface, sea surface or sea bed. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources such as, for example, borehole logging, gravity surveys, and magnetic surveys. One approach to seismic analysis is based on tracing and correlating along continuous reflectors throughout the dataset produced by the seismic survey to produce structural maps that reflect the spatial variation in depth of certain facies. The structural maps can be used to identify impermeable layers and faults that can trap hydrocarbons such as oil and gas.

SUMMARY

This specification describes systems and methods for identifying a geological structural style of a subterranean formation based on seismic reflections. A geological structural style includes associations of geological structures that often occur together due to a common origin. A data processing system, such as a control system or a computer, acquires seismic reflection measurements of a subterranean formation. The data processing system isolates large amplitude signal(s) (such as a set of the largest amplitude signals). The data processing system identifies, from the isolated signals, a best fit between the isolated signals and an obtained set of structural geology geometric primitives. The geometric primitives include the geometries and spatial relationships of deformed rock units and domain boundaries at a scale relevant for reflection seismic interpretation. Based on the best fit and a determined degree of confidence, the data processing system determines a geological structural style of the subterranean formation.

Implementations of the systems and methods of this disclosure can provide various technical benefits. Interpreting reflection seismic data can be challenging in frontier exploration situations where there is no prior knowledge of the subsurface geological structure. For example, the frontier exploration situations can include exploring remote basins for hydrocarbons, for hydrogen, or for locations for $CO_2$-sequestration. Data describing the subsurface can be sparse because there may exist no drilled wells in the subterranean formation. In another example, the reflection seismic data may include, or be limited to, sparse, widely separated lines of section. A system that is analyzing these data may be required to process the data using only single lines of section without a benefit of intersecting cross-sections. In such cases, the system may fail to correctly determine a type of geological structure or structural style represented in the data using conventional processing techniques, especially if the seismic data has a low signal to noise ratio.

To overcome these challenges, the systems and methods of this disclosure determine a geological structure style in the reflection seismic measurements based on a set of structural geology geometric primitives that include a small collection of lines representing a geological structural style such as extension, compression, or strike-slip. The geometric primitives are geometrically invariant under scaling and stretching and can be used for seismic reflection data at many scales independent from aspect ratio and spatial coverage of the seismic data. Using the geometric primitives, the data processing system can determine a geological structural style of the subterranean formation based on sparse seismic data and seismic data with low signal to noise ratio. Other technical advantages include the prioritization of geometrical primitives to guide automated detailed mapping procedures such as fault interpretation and fault network characterization.

In one aspect, a method for determining a geological structural style of a subterranean formation includes acquiring seismic reflection measurements of the subterranean formation; isolating one or more signals in the acquired measurements, the one or more signals having larger amplitudes relative to one or more other signals in the acquired measurements; obtaining a set of structural geology geometric primitives wherein each structural geology geometric primitive comprises geometric data representing a known structural geological style; identifying at least one best fit between a set of the one or more isolated signals and a structural geology geometric primitive from the set of structural geology geometric primitives; determining a degree of confidence for at least one best fit identified; and determining a geological structural style of the subterranean formation based on the identified at least one best fit and based on the determined degree of confidence for that best fit.

In one aspect, a system for identifying a geological structural style of a subterranean formation includes at least one processor; and a memory storing instructions that, when executed by the at least one processor, cause the at least one processor to perform operations including accessing, from a data store, seismic reflection measurements of the subterranean formation; isolating one or more signals in the accessed measurements, the one or more signals having larger amplitudes relative to one or more other signals in the accessed measurements; obtaining a set of structural geology geometric primitives wherein each structural geology geometric primitive comprises geometric data representing a known structural geological style; identifying at least one best fit between a set of the one or more isolated signals and a structural geology geometric primitive from the set of structural geology geometric primitives; determining a degree of confidence for at least one best fit identified; and determining a geological structural style of the subterranean formation based on the identified at least one best fit and based on the determined degree of confidence for that best fit.

In one aspect, one or more non-transitory machine-readable storage devices storing instructions for identifying a geological structural style of a subterranean formation, the instructions being executable by one or more processors, to cause performance of operations including accessing, from a data store, seismic reflection measurements of the subterranean formation; isolating one or more signals in the accessed measurements, the one or more signals having larger amplitudes relative to one or more other signals in the accessed measurements; obtaining a set of structural geology geometric primitives wherein each structural geology geometric primitive comprises geometric data representing a known structural geological style; identifying at least one best fit between a set of the one or more isolated signals and a structural geology geometric primitive from the set of structural geology geometric primitives; determining a degree of confidence for at least one best fit identified; and determining a geological structural style of the subterranean formation based on the identified at least one best fit and based on the determined degree of confidence for that best fit.

Embodiments of these aspects may include one or more of the following features.

In some embodiments, isolating one or more signals includes using a user specified threshold to isolate signals having larger amplitudes relative to one or more other signals in the acquired measurements.

In some embodiments, isolating one or more signals includes isolating one or more signals based on a value of a seismic attribute comprising at least one of seismic reflector continuity and instantaneous phase.

In some embodiments, identifying at least one best fit includes identifying key points in at least one isolated signal using a scale invariant feature transform (SIFT); determining a probability of match based on a Euclidean distance between key points in the at least one isolated signal and key points in the set of structural geology geometric primitives; and selecting a structural geology geometric primitive from the set of structural geology geometric primitives with a highest probability of match with the at least one isolated signal.

In some cases, determining a degree of confidence for each fit is based on the probability of match for each best fit identified.

In some embodiments, these aspects include generating a geological structural map of the subterranean formation based on the acquired seismic measurements and the determined geological structural style.

In some cases, these aspects include determining locations to drill wells in the subterranean formation based on the geological structural map of the subterranean formation. In some cases, these aspects include controlling a drilling mechanism based on the determined geological structural style and determined location in the subterranean formation.

In some embodiments, these aspects include identifying portions of the subterranean formation to acquire 3D reflection seismic measurements based on the determined geological structural style.

In some embodiments, identifying a best fit includes determining a length scale for the set of structural geology geometric primitives based on a length scale of the acquired seismic measurements; scaling the set of structural geology geometric primitives based on the determined length scale; calculating correlation factors based on cross-correlations between the isolated signals and the scaled set of structural geology geometric primitives; and selecting the structural geology geometric primitive with a highest correlation factor as the best fit with the isolated signals. In some cases, determining a degree of confidence for each best fit is based on the correlation factors.

In some embodiments, these aspects include obtaining a set of sedimentary geology geometric primitives wherein each sedimentary geology geometric primitive comprises geometric data representing a known sedimentary geological style; identifying at least one best fit between a set of the one or more isolated signals and a sedimentary geology geometric primitive from the set of sedimentary geology geometric primitives; determining a degree of confidence for at least one best fit identified; and determining a geological sedimentary style of the subterranean formation based on the identified at least one best fit and based on the determined degree of confidence for that best fit.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIG. 2 is a flow chart of an example method of identifying the structural geological style of a subterranean formation.

Like reference symbols in the various drawings indicate like elements.

DETAILED DESCRIPTION

This specification describes systems and methods for identifying a geological structural style of a subterranean formation using seismic reflection data. A data processing system acquires seismic measurements of the subterranean formation. The data processing system isolates the largest amplitude signals within the seismic data. The data processing system obtains a set of geometric primitives representing various geological structural styles including extension, compression, and strike-slip. The data processing system identifies a best-fit between the isolated signals and one of the geometric primitives of the set. The data processing system also determines a degree of confidence of the best fit. Based on the best fit and degree of confidence, the data processing system determines a geological structural style of the subterranean formation.

Figure 1:
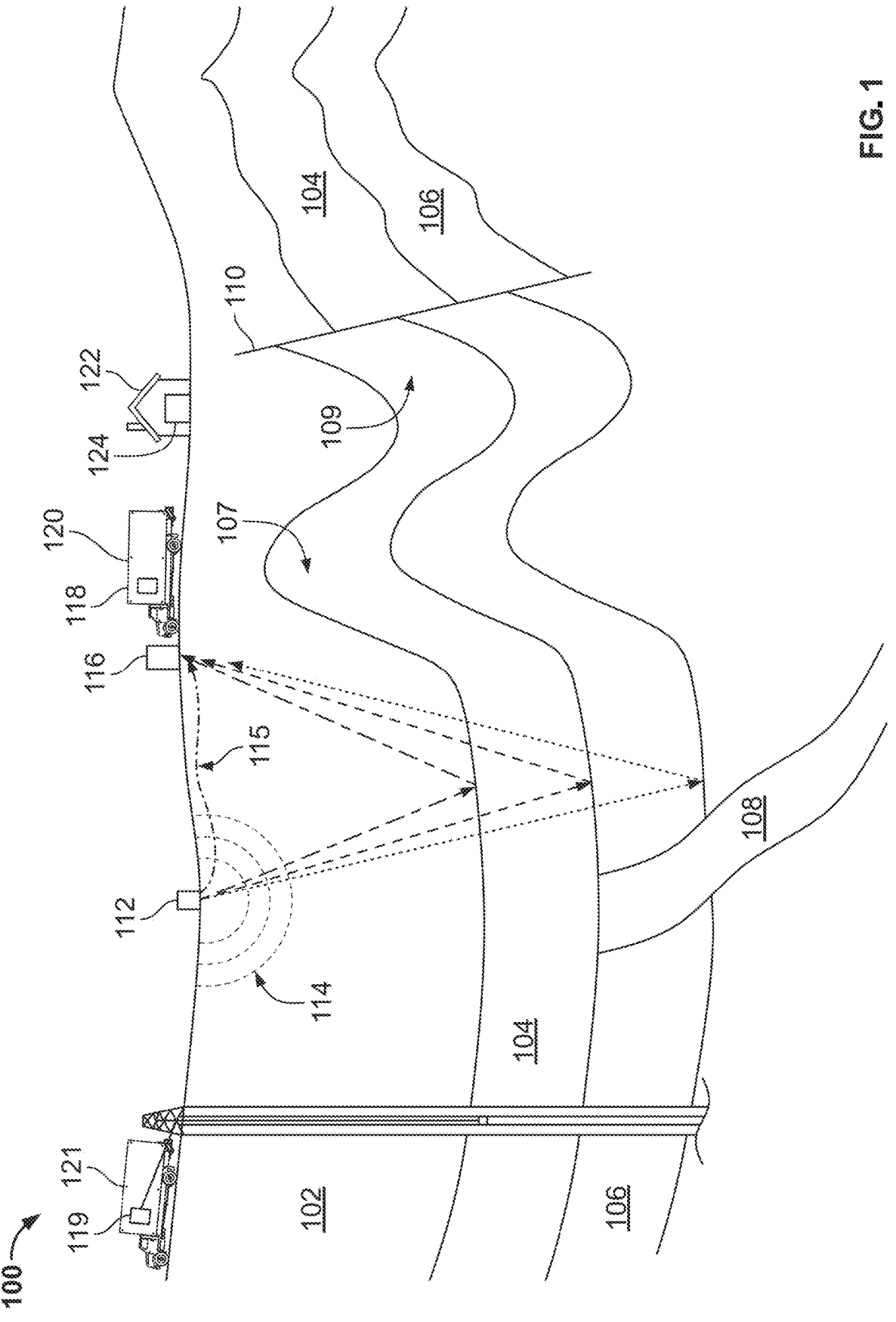
FIG. 1 is a schematic view of a seismic survey being performed to map subterranean features such as facies and faults.

FIG. 1 is a schematic view of a seismic survey being performed to map subterranean features such as facies and faults in a subterranean formation 100. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

A seismic source 112 (for example, a seismic vibrator or an explosion) generates seismic waves 114 that propagate in the earth. The velocity of these seismic waves depends on properties such as, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interface reflects some of the energy of the seismic wave and refracts part of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output such as, for example, a seismic two-way response time plot.

A control center 122 can be operatively coupled to the seismic control truck 120 and other data acquisition and wellsite systems. The control center 122 may have computer facilities for receiving, storing, processing, and/or analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems. In some embodiments, results generated by the computer system 124 may be displayed for user viewing using local or remote monitors or other display units.

FIG. 2 is a flow chart of a method 200 for determining a geological structural style of a subterranean formation. The method 200 uses a data processing system such as the computer systems 124 shown in FIG. 1 to acquire seismic measurements of a subterranean formation and identify geological structural styles within the subterranean formation based on the seismic measurements. The data processing system determines the geological structural style using a set of structural geology geometric primitives that include basic geometries representative of geological structural styles. The structural geology geometric primitives are also scale invariant. The data processing system can determine the geological structural style in seismic measurements that are sparse, have a low signal to noise ratio, or both as a result of the simplicity and scale invariance of the structural geology geometric primitives.

The data processing system acquires seismic reflection measurements of the subterranean formation (step 202). In some implementations, the data processing system accesses the seismic reflection measurements from a data store. In some implementations, the seismic measurements include a small number of seismic reflection lines, and in some cases the seismic measurements include a single cross section such as a 2D seismic line or a single line taken from a 3D seismic survey.

The data processing system isolates one or more signals in the acquired measurements that have a large amplitude relative to one or more other signals in the acquired measurement (step 204). For example, the data processing system isolates the largest amplitude signals in the acquired measurements. In some implementations, the data processing system isolates the largest amplitude signals by isolating signals with an amplitude larger than a user specified threshold amplitude. In some implementations, the data processing system isolates the largest amplitude signals based on a generated seismic attribute, for example, seismic reflector continuity or instantaneous phase. In some implementations, the data processing system automatically selects a threshold value to isolate the largest amplitude signals. For example, the data processing system can use the signal to noise ratio to automatically select a threshold value.

The data processing system obtains a set of structural geology geometric primitives (step 206). Each geometric primitive in the set of structural geology geometric primitives includes geometric data representing a known geological structural style. In some implementations, the data processing system accesses the set of structural geology primitives from a data store. Structural geology geometric primitives capture the basic geometries and spatial relationships of deformed rock units and domain boundaries at a scale relevant to reflection seismic interpretation. The geometric primitives (e.g., structural geology primitives) are scale-independent because similar expressions of structural geology style are the same at scales from centimeters to tens of kilometers. Geometric primitives retain their identity under stretching. The aspect ratio of the acquired reflection seismic data does not need to be 1:1 and can be unknown. Reflection seismic sections are rarely interpreted or displayed at 1:1 aspect ratio and many 2D reflection seismic lines are processed with a vertical scale in units of two-way travel time which is related to depth by seismic velocity, which is uncertain, resulting in an uncertain aspect ratio.

In some implementations, structural geology geometric primitives are represented by a small collection of lines that are geometrically invariant under scaling and stretching and can be used in relation to reflection seismic cross sections regardless of the spatial coverage that the cross sections represent and independent of the aspect ratio of the seismic reflections. In some implementations, the structural geology geometric primitives are restricted to a small set representing three basic geological structural styles (e.g., compression, extension, strike slip). In some implementations, the set of structural geology geometric primitives encompasses subsets of geological structural style such as variants on extension or compression in relation to a complexity of in situ geological layering. The set of structural geology geometric primitives can be extended and refined into as many subsets of geological structure style as desired for an implementation.

Implementations using fewer, more general structural geology geometric primitives (e.g., extension, strike-slip, and compression) are computationally faster and allow for complex arrangements where different geological structural style domains are present in a single area or length scale. Implementations using a larger set of structural geology geometric primitives have the advantage of a more specific identification of geological structural style with an associated increase in information about the mechanical stratigraphy of the subterranean formation and guidance for detailed interpretation of the seismic measurements.

Figure 3A:
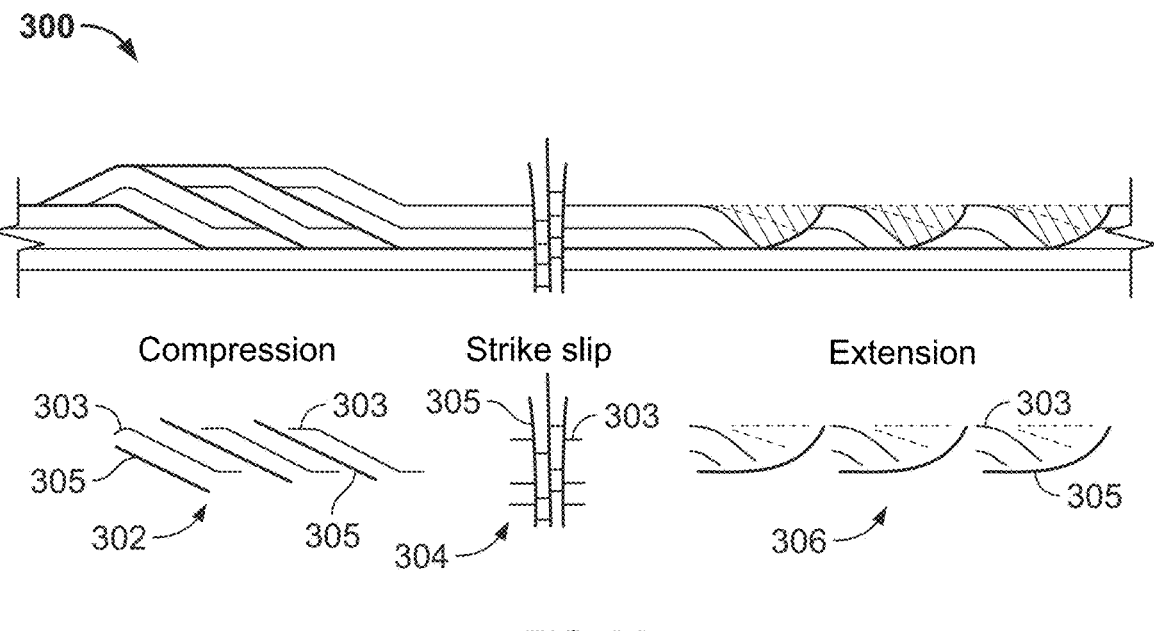
FIGS. 3A-3B show illustrations of example structural geology geometric primitives.

Turning briefly to FIG. 3A, an illustration of a subsurface structure 300 is shown, such as the subsurface 100 described previously in relation to FIG. 1. The subsurface structure 300 can include one or more basic structural geology geometric styles. For example, the subsurface structure can include a compression structural geology style represented by a structural geology geometric primitive 302. The compression structural geology geometric primitive 302 includes approximately parallel lines that are inclined or stacked, and in this stack the lines that represent geological formation boundaries 303 and those that represent faults 305 are broadly parallel to one another. Another example of a structural geology geometric primitive is a strike-slip structural primitive 304. The strike-slip structural geology geometric primitive 304 includes long mostly vertical lines joined by short horizontal lines. The steep or vertical lines are generally faults 305 and the horizontal or gently-inclined segments are geological formation boundaries 303. Discontinuities between the horizontal lines exist across the vertical lines as shown. Another example of a structural primitive of the subsurface structure is an extension structural primitive 306. The extension structural geology geometric primitive 306 includes groups of lines sloping in opposing directions where one group is geological faults 305 and the other group is geological formation boundaries 303. Instances of structural primitives in example subsurface instances (such as subsurface 300) can be mined from previously collected and analyzed data. The historical data provide spectra of structural styles among these basic structural geology geometric primitives. For example, each spectrum can include a plurality of instances of a structural geology geometric primitive (such as primitives 302, 304, and 306) which in turn each have a slightly different feature set than other instances of that structural geology geometric primitive.

Figure 3B:
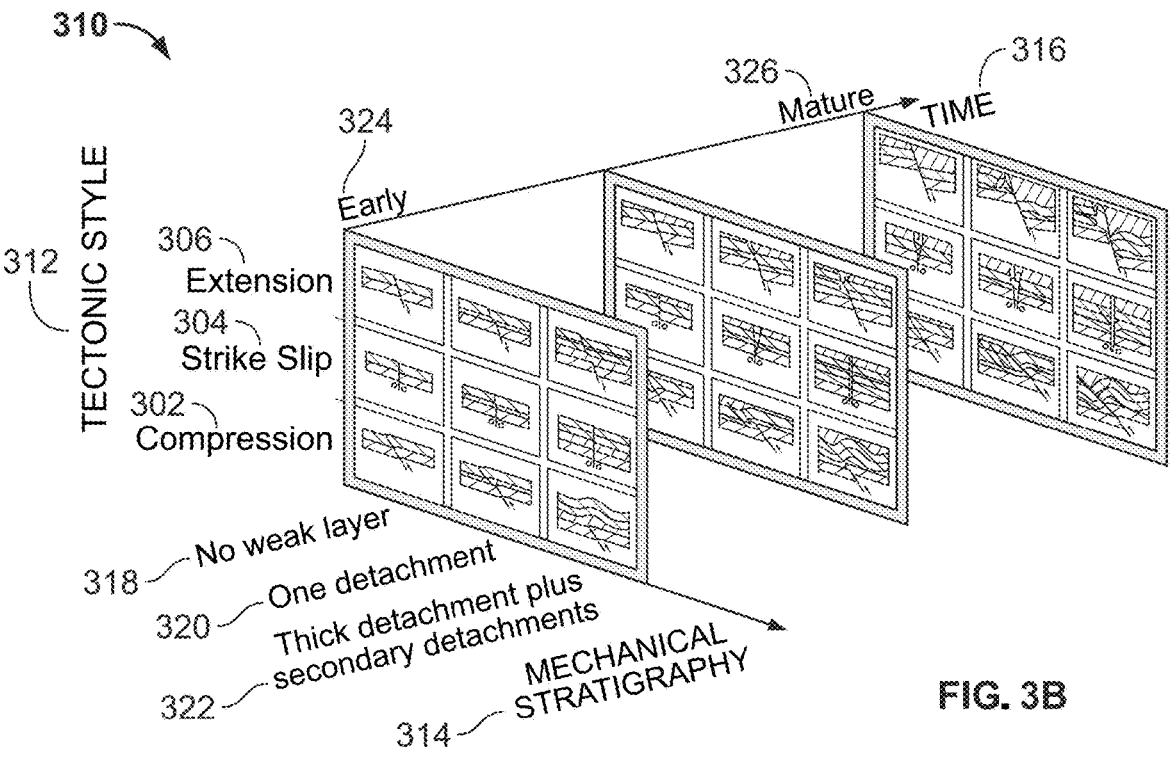

FIG. 3B shows illustrations 310 of subsets or spectra of the structural geology geometric primitives shown in FIG. 3A. The tectonic style 312 is shown along the vertical axis, the mechanical stratigraphy 314 is shown along a horizontal axis, and time 316 is shown along a second horizontal axis. The tectonic styles 312 include compression 302, strike-slip 304 and extension 306. The mechanical stratigraphies 314 include no weak layer 318, one detachment 320, and thick detachment plus secondary detachments 322. The time 316 axis progresses from early 324 structural styles to mature 326 structural styles. Using a larger set of structural geology geometric primitives allows the data processing system to identify a more specific structural style of the subterranean formation. Based on the more specific structural style, additional information about the subterranean formation can be inferred. For example, a more specific structural style may identify the mechanical stratigraphy, the relative age of rock deformations, or the tectonic style of the subterranean formation. The data processing system may determine areas of the subterranean formation with a higher probability of having hydrocarbons for more detailed exploration based on the more specific structural style.

Turning back to FIG. 2, for method 200, the data processing system identifies at least one best fit between at least one isolated signal from the acquired seismic measurements and the set of structural geology geometric primitives (step 208). Determining the best-fit comprises comparing features included in the known structural primitives to features extracted from the acquired seismic measurements. The comparison can include machine learning techniques, statistical techniques, or a combination thereof.

The data processing system can execute a machine learning process to identify a best-fit. For example, the data processing system identifies a set of feature vectors representing key points within the isolated signals and the set of structural primitives using a scale-invariant feature transform (SIFT). The data processing system calculates a Euclidean distance between the feature vectors of an isolated signal and the feature vectors of the set of structural primitives. The data processing system determines a probability of match between the isolated signal and each of the structural primitives based on the calculated Euclidean distances. The data processing system selects the structural primitive with the highest probability of match as the best-fit. In these implementations, the data processing system determines the degree of confidence based on the probability of match between the isolated signal and the selected structural primitive.

The data processing system can use statistical methods to determine a best-fit. The data processing system determines a length scale based on a length scale of the acquired seismic measurements. For example, the data processing system can determine the length scale to be in the range of 1 km to 10 km based on the scales visible in reflection seismic data. The data processing system scales the set of structural geology geometric primitives based on the determined length scale. The data processing system identifies the best-fit between the isolated signals and the scaled set of structural primitives based on a cross-correlation technique. In these implementations, a correlation factor associated with each structural primitive is calculated by performing a cross-correlation between the isolated signal and each structural primitive. The data processing system selects the structural primitive with the highest correlation factor as the best match for the isolated signal.

In some implementations, multiple signals are isolated within the set of acquired measurements. These multiples are a common geophysical artifact that result from seismic energy reflecting from more than one subsurface horizon before being recorded back at the surface. The data processing system determines a best-fit for each isolated signal. When the data processing system determines that a signal is equally well fit with more than one structural geological geometric primitive, the data processing system can use the best fit from nearby isolated signals to select which structural geometric style is the best-fit. In other implementations, the data processing system can flag areas where it is difficult to identify a single, or any, structural style as being uncertain and requiring alternative analysis. The data processing system determines regions to flag based on closeness of the best fit. For example, a region can be flagged if the measure of the best fit (e.g., probability of match or correlation factor) is below a predetermined threshold.

The data processing system determines a degree of confidence for at least one best fit identified (step 210). The degree of confidence represents how well the structural geology geometric primitive fits the isolated signal. For example, the degree of confidence can be a normalized value (between 0 and 1) expressing a probability value.

The data processing system determines a structural geological style of the subterranean formation based on the identified at least one best-fit and the degree of confidence of that best fit (step 212). A structural geological style includes information about the three dimensional distribution of rocks and the deformation history of rocks in the subterranean formation. In some implementations, the subterranean formation has multiple geological structural styles. Multiple geological structural styles can occur in a single formation in different places. For example, there may be compression in one location that is genetically linked to extension in another location. In another example, there may be superimposed structural styles, where extension, for example is overprinted by compression. This is known as inversion and can become progressively more complex and difficult to automatically identify, though it may be possible to train algorithms using geometrical primitives that capture geometries that develop in structural inversion.

The structural geological style is useful for identifying regions of a subterranean formation that may have a higher likelihood of holding hydrocarbons. Implementations of the method 200 can identify the geological structural style of subterranean formations with sparse seismic data or seismic data with a low signal to noise ratio. Based on the determined geological structural style of the formation, the data processing system can guide further exploration of the subsurface formation. For example, the data processing system can assist in exploration for hydrocarbons (e.g., drilling a well) based on the determined geological structural style(s) identified for a subsurface region.

Figure 4:
FIG. 4 is a representation of an implementation of a method of identifying the structural geological style of a subterranean formation.

FIG. 4 is a representation 400 of an implementation of the method 200, previously described in relation to FIG. 2. A representative seismic line 402 is acquired by the data processing system. This example seismic line 402 is approximately 250 km long. The method 200 can be applied to seismic data taken at other scales, for example, an ultra-high frequency seismic section that is a few meters long.

The data processing system isolates the strongest signals (e.g., the signals with the largest amplitude) in the dataset, and the resulting image 404 is shown. Image 404 shows stronger signals as darker lines (e.g., 405) that stand out from the background more than in image 402.

The data processing system obtains a set of basic structural geometric primitives 406 representing styles of structural geology. In this implementation, the left-right polarity of the geometric primitives is not significant, and the data processing system can be configured to flip the primitives as part of the identifying a best fit. The data processing system identifies the best fit between the isolated signals 404 and the geometric primitives 406.

Image 408 shows the isolated signals 405 overlaid with the identified best fit structural primitives 409. In this example, structural styles are identified in four regions. The first region 410 and second region 412 show a good fit with the compressional style with a high degree of confidence represented by the shading of the circular quality control indicators 414, 416. The third and fourth regions 418 and 420 fit equally well with the compressional and extensional primitives with moderate confidence indicated by the quality control indicators 422, 424. The data processing system determines that the overall geological structural style is compressional with the degree of confidence variable from one part of the seismic cross-section to another.

Identification of geological structural style can enable accurate and efficient subsurface mapping workflows. For example, the data processing system can automatically classify large datasets into domains characterized by a given geological structural style. In commercial applications, identifying a geological structural style of a subsurface formation can increase the success rate in drilled well outcomes because the geological concept that the well is based on is more likely to be accurate and geological layers are more likely to be found in the locations as predicted. Commerciality is also derisked by identifying the geological structural style because the larger structural picture (for example large fold versus large fault block) is more likely to be correct with implications for expected fluid or storage volume availability.

In some implementations, the methods and systems of this disclosure are used for recognition of domains in an early phase of sedimentary basin mapping on the basis of sparse, relatively cheap data such as 2D regional seismic lines. Geological domains recognized from such data can focus the investment of more intensive and expensive data such as 3D reflection seismic and drilled wells.

The data processing system obtains a set of geometric primitives that include sedimentary facies architectures. In these implementations, the data processing system can provide a structural and sedimentary architecture reference by determining a sedimentary style of the subsurface formation based on at least one best fit between isolated signals in the seismic data and the set of sedimentary geometric primitives.

In some implementations, the data processing system determines locations within the subsurface formation to drill wells based on the determined geological structural style. In some implementations, the data processing system generates commands to control a drilling mechanism to drill wells in the subterranean formation.

Figure 5:
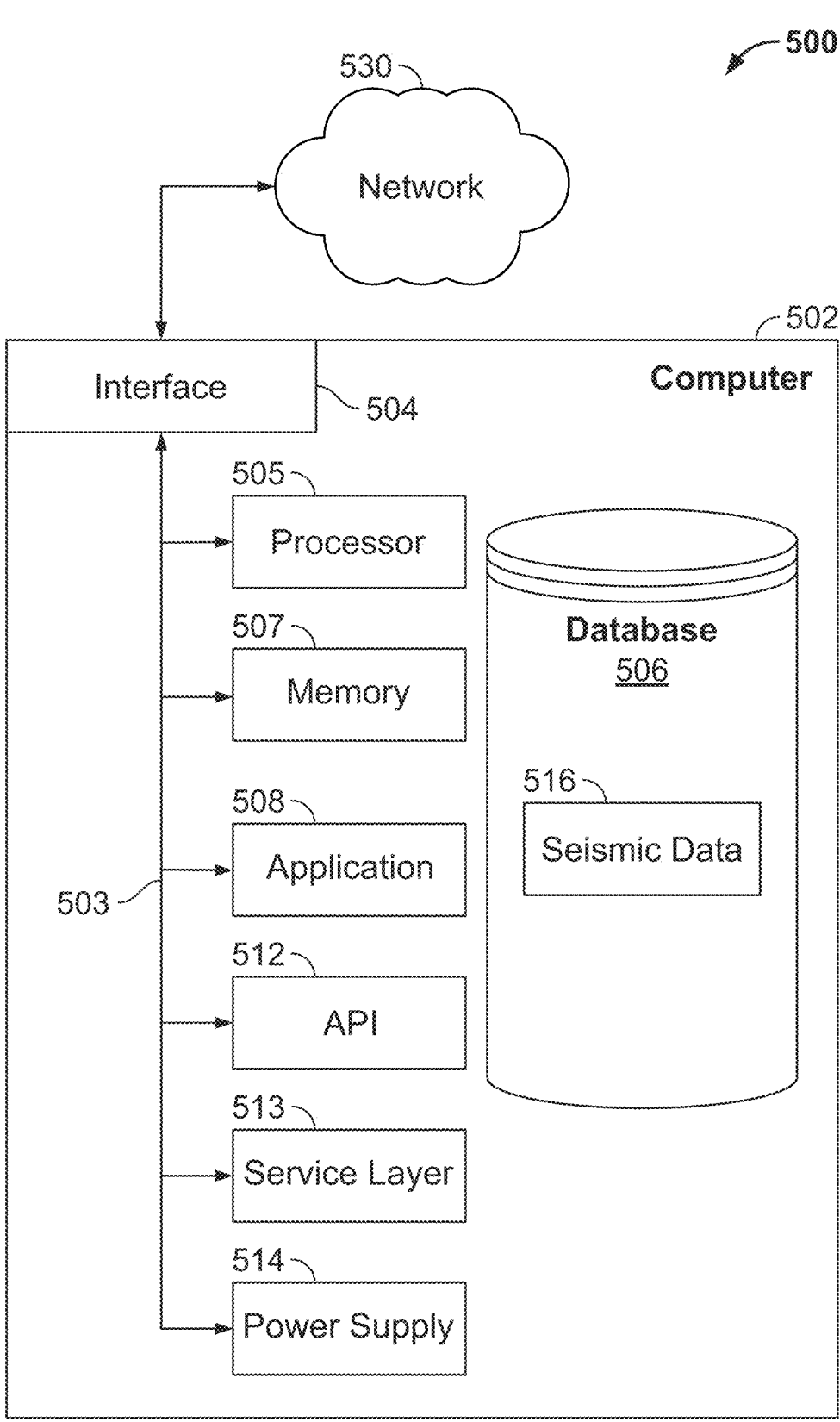
FIG. 5 is a block diagram illustrating an example computer system used to provide computational functionalities associated with described algorithms, methods, functions, processes, flows, and procedures according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure.

Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for determining a geological structural style of a subterranean formation, the method comprising:
    acquiring seismic reflection measurements of the subterranean formation;

isolating one or more signals in the acquired measurements, the one or more signals having larger amplitudes relative to one or more other signals in the acquired measurements;

obtaining a set of structural geology geometric primitives wherein each structural geology geometric primitive comprises geometric data representing a known structural geological style;

identifying at least one best fit between a set of the one or more isolated signals and a structural geology geometric primitive from the set of structural geology geometric primitives;

determining a degree of confidence for at least one best fit identified; and determining a geological structural style of the subterranean formation based on the identified at least one best fit and based on the determined degree of confidence for that best fit.

2. The method of claim 1, wherein isolating one or more signals comprises using a user specified threshold to isolate signals having larger amplitudes relative to one or more other signals in the acquired measurements.

3. The method of claim 1, wherein isolating one or more signals comprises isolating one or more signals based on a value of a seismic attribute comprising at least one of seismic reflector continuity and instantaneous phase.

4. The method of claim 1, wherein identifying at least one best fit comprises identifying key points in at least one isolated signal using a scale invariant feature transform (SIFT);

determining a probability of match based on a Euclidean distance between key points in the at least one isolated signal and key points in the set of structural geology geometric primitives; and selecting a structural geology geometric primitive from the set of structural geology geometric primitives with a highest probability of match with the at least one isolated signal.

5. The method of claim 4, wherein determining a degree of confidence for each fit is based on the probability of match for each best fit identified.

6. The method of claim 1, further comprising:

generating a geological structural map of the subterranean formation based on the acquired seismic measurements and the determined geological structural style.

7. The method of claim 6, further comprising:

determining one or more locations to drill wells in the subterranean formation based on the geological structural map of the subterranean formation.

8. The method of claim 7, further comprising:

controlling a drilling mechanism based on the determined geological structural style and the determined one or more locations in the subterranean formation.

9. The method of claim 1, further comprising:

identifying portions of the subterranean formation to acquire 3D reflection seismic measurements based on the determined geological structural style.

10. The method of claim 1, wherein identifying a best fit comprises:

determining a length scale for the set of structural geology geometric primitives based on a length scale of the acquired seismic measurements;

scaling the set of structural geology geometric primitives based on the determined length scale;

calculating correlation factors based on cross-correlations between the isolated signals and the scaled set of structural geology geometric primitives; and selecting the structural geology geometric primitive with a highest correlation factor as the best fit with the isolated signals.

11. The method of claim 10, wherein determining a degree of confidence for each best fit is based on the correlation factors.

12. The method of claim 1, further comprising:

obtaining a set of sedimentary geology geometric primitives wherein each sedimentary geology geometric primitive comprises geometric data representing a known sedimentary geological style;

identifying at least one best fit between a set of the one or more isolated signals and a sedimentary geology geometric primitive from the set of sedimentary geology geometric primitives;

determining a degree of confidence for at least one best fit identified; and determining a geological sedimentary style of the subterranean formation based on the identified at least one best fit and based on the determined degree of confidence for that best fit.

13. A system for identifying a geological structural style of a subterranean formation, the system comprising:

at least one processor; and a memory storing instructions that, when executed by the at least one processor, cause the at least one processor to perform operations comprising:

accessing, from a data store, seismic reflection measurements of the subterranean formation;

isolating one or more signals in the accessed measurements, the one or more signals having larger amplitudes relative to one or more other signals in the accessed measurements;

obtaining a set of structural geology geometric primitives wherein each structural geology geometric primitive comprises geometric data representing a known structural geological style;

identifying at least one best fit between a set of the one or more isolated signals and a structural geology geometric primitive from the set of structural geology geometric primitives;

determining a degree of confidence for at least one best fit identified; and determining a geological structural style of the subterranean formation based on the identified at least one best fit and based on the determined degree of confidence for that best fit.

14. The system of claim 13, wherein identifying at least one best fit comprises:

identifying key points in at least one isolated signal using a scale invariant feature transform (SIFT);

determining a probability of match based on a Euclidean distance between key points in the at least one isolated signal and key points in the set of structural geology geometric primitives; and selecting a structural geology geometric primitive from the set of structural geology geometric primitives with a highest probability of match with the at least one isolated signal.

15. The system of claim 14, wherein determining a degree of confidence for each fit is based on the probability of match for each best fit identified.

16. The system of claim 13, the operations further comprising:

generating a geological structural map of the subterranean formation based on the acquired seismic measurements and the determined geological structural style; and determining one or more locations to drill wells in the subterranean formation based on the geological structural map of the subterranean formation.

17. One or more non-transitory machine-readable storage devices storing instructions for identifying a geological structural style of a subterranean formation, the instructions being executable by one or more processors, to cause performance of operations comprising:

accessing, from a data store, seismic reflection measurements of the subterranean formation;

isolating one or more signals in the accessed measurements, the one or more signals having larger amplitudes relative to one or more other signals in the accessed measurements;

obtaining a set of structural geology geometric primitives wherein each structural geology geometric primitive comprises geometric data representing a known structural geological style;

identifying at least one best fit between a set of the one or more isolated signals and a structural geology geometric primitive from the set of structural geology geometric primitives;

determining a degree of confidence for at least one best fit identified; and determining a geological structural style of the subterranean formation based on the identified at least one best fit and based on the determined degree of confidence for that best fit.

18. The non-transitory machine readable storage devices of claim 17, wherein identifying at least one best fit comprises:

identifying key points in at least one isolated signal using a scale invariant feature transform (SIFT);

determining a probability of match based on a Euclidean distance between key points in the at least one isolated signal and key points in the set of structural geology geometric primitives; and selecting a structural geology geometric primitive from the set of structural geology geometric primitives with a highest probability of match with the at least one isolated signal.

19. The non-transitory machine readable storage devices of claim 18, wherein determining a degree of confidence for each fit is based on the probability of match for each best fit identified.

20. The non-transitory machine readable storage devices of claim 17, the operations further comprising:

generating a geological structural map of the subterranean formation based on the acquired seismic measurements and the determined geological structural style; and determining one or more locations to drill wells in the subterranean formation based on the geological structural map of the subterranean formation.

* * * * *